United States Patent
Muthiah

(10) Patent No.: US 12,254,193 B2
(45) Date of Patent: Mar. 18, 2025

(54) STORAGE COMPUTE SERVICES FOR ENCRYPTED DATA

(71) Applicant: Western Digital Technologies, Inc., San Jose, CA (US)

(72) Inventor: Ramanathan Muthiah, Karnataka (IN)

(73) Assignee: SANDISK TECHNOLOGIES, INC., Milpitas, CA (US)

( * ) Notice: Subject to any disclaimer, the term of this patent is extended or adjusted under 35 U.S.C. 154(b) by 352 days.

(21) Appl. No.: 17/737,686

(22) Filed: May 5, 2022

(65) Prior Publication Data
US 2023/0359369 A1 Nov. 9, 2023

(51) Int. Cl.
G06F 11/30 (2006.01)
G06F 3/06 (2006.01)
G06F 12/14 (2006.01)

(52) U.S. Cl.
CPC .......... G06F 3/0623 (2013.01); G06F 3/0655 (2013.01); G06F 3/0679 (2013.01)

(58) Field of Classification Search
CPC ..... G06F 3/0623; G06F 3/0655; G06F 3/0679
USPC ........................................................ 713/193
See application file for complete search history.

(56) References Cited

U.S. PATENT DOCUMENTS

| | | | |
|---|---|---|---|
| 8,010,810 B1 * | 8/2011 | Fitzgerald | H04L 9/0891 380/278 |
| 10,387,661 B2 | 8/2019 | Davis et al. | |
| 11,144,635 B2 | 10/2021 | Sutton et al. | |
| 2018/0034787 A1 | 2/2018 | Kamaraju et al. | |
| 2018/0191721 A1 | 7/2018 | Freyensee et al. | |
| 2021/0157745 A1 | 5/2021 | Bavishi | |
| 2022/0309194 A1 * | 9/2022 | Muthiah | G06F 12/1408 |

* cited by examiner

Primary Examiner — Brandon Hoffman
Assistant Examiner — Samuel Ambaye
(74) Attorney, Agent, or Firm — ARENTFOX SCHIFF LLP

(57) ABSTRACT

Aspects of a storage device are provided that perform partial decryption of host encrypted data and encryption of host provided data using received or generated keys for data targeted for compute services. The storage device may include a non-volatile memory and a controller. The controller may receive encrypted data, receive a key associated with a portion of the encrypted data, and decrypt the portion of the encrypted data based on the key without decrypting a remainder of the encrypted data. The controller may also receive data, receive or generate a key associated with a portion of the data, encrypt the portion of the data based on the key without encrypting a remainder of the data based on the key, and store the encrypted portion of the data in the non-volatile memory for subsequent decryption. As a result, a balance between encrypted data storage and decrypted data security may be achieved.

17 Claims, 10 Drawing Sheets

STORAGE COMPUTE SERVICES FOR ENCRYPTED DATA

BACKGROUND

Field

This disclosure is generally related to electronic devices and more particularly to storage devices.

Introduction

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

Flash storage devices are typically used as computation platforms due to their ease of use and power efficiency in performing computations on data stored in the flash memory. Computations may include, for example, data filtering, media processing, data analysis, machine learning, or data transformations which are performed on stored data in the flash memory. Generally, this stored data is encrypted since the host device may not be willing to share that data with other systems.

SUMMARY

One aspect of a storage device is disclosed herein. The storage device includes a controller. The controller is configured to receive encrypted data, to receive a key associated with a portion of the encrypted data, and to decrypt the portion of the encrypted data based on the key without decrypting a remainder of the encrypted data.

Another aspect of a storage device is disclosed herein. The storage device includes a controller. The controller is configured to receive data, to receive a key associated with a portion of the data, and to encrypt the portion of the data based on the key without encrypting a remainder of the data based on the key.

A further aspect of a storage device is disclosed herein. The storage device includes a non-volatile memory and a controller. The controller is configured to receive data, to generate a key associated with a portion of the data, to encrypt the portion of the data based on the key without encrypting a remainder of the data based on the key, and to store the encrypted portion of the data in the non-volatile memory.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
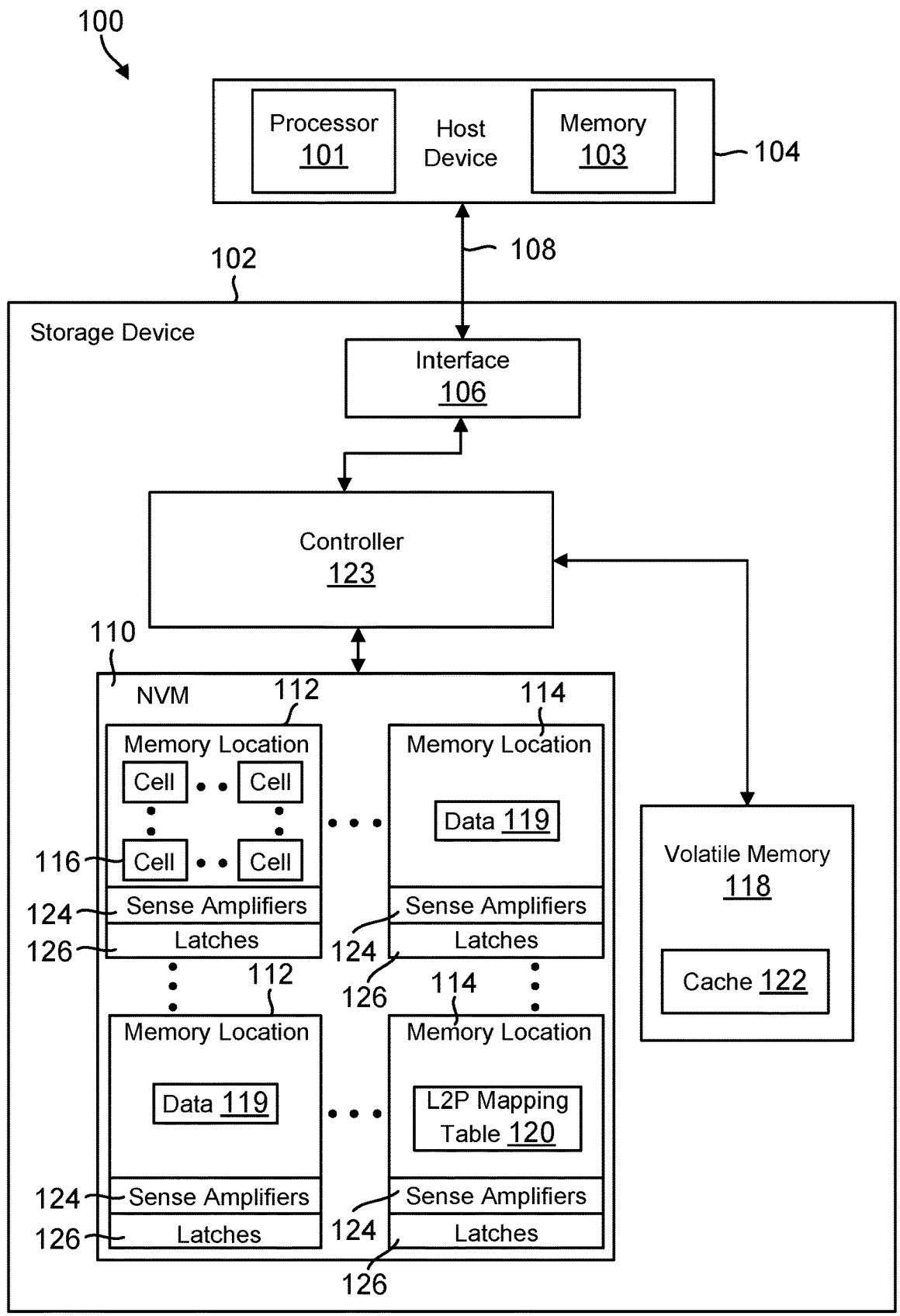
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

In certain applications, a host device may intend to perform data computations, such as data filtering, media processing, data analysis, machine learning, etc. Typically, the host device does not include sufficient memory and resources to dedicate to such computations, and therefore the host device may tend to offload this work to a storage device (e.g., an SSD) interfacing with the host device. The storage device may include a large supply of memory and resources available to apply these computations, and therefore the host device may send the data to the storage device to store and subsequently perform any data computations requested by the host device.

Figure 6:
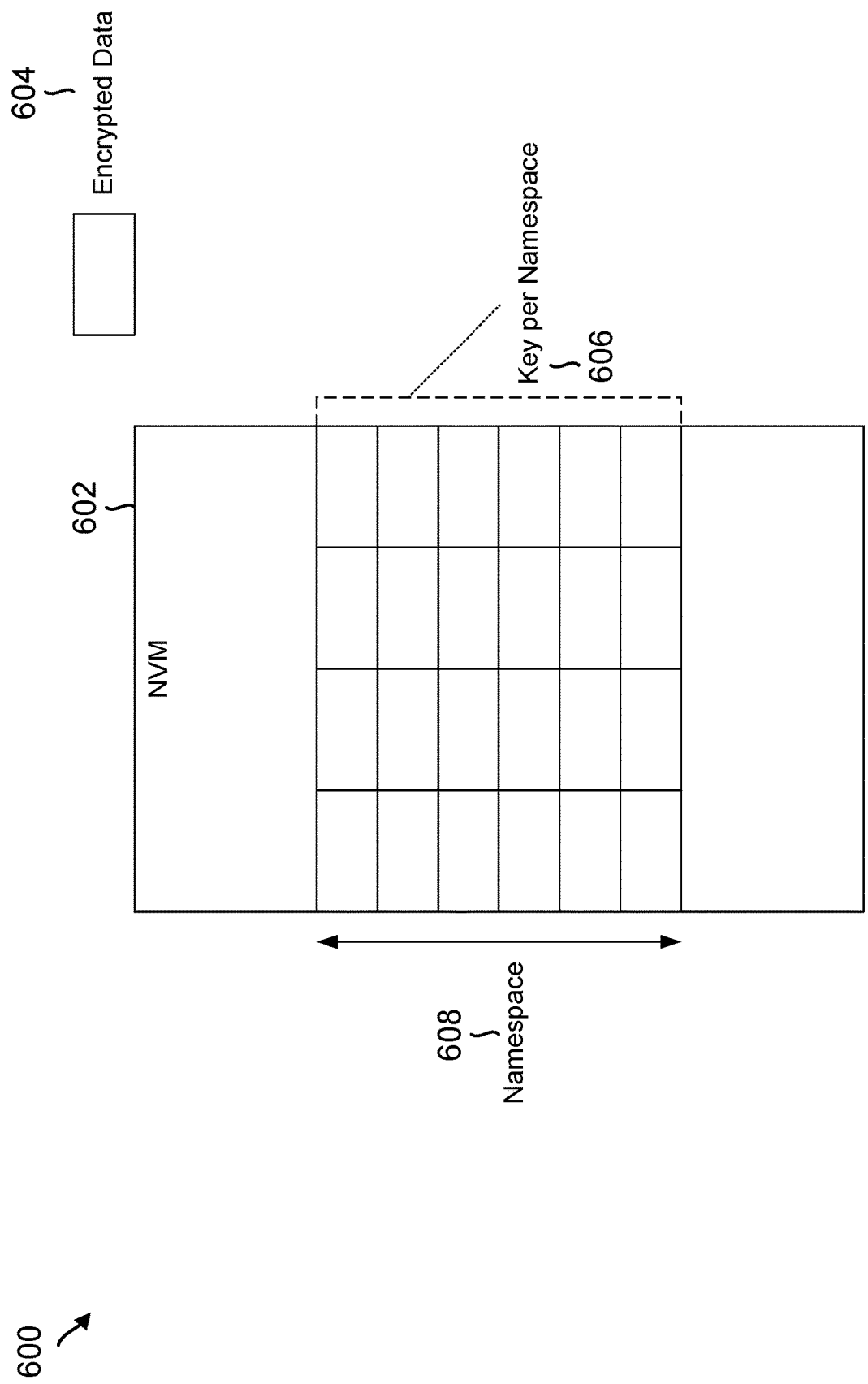
FIG. 6 is a conceptual diagram illustrating an example of a non-volatile memory storing data that is encrypted with a key for a namespace including the stored data.

Generally, to prevent this data from being exposed to unauthorized parties over the network interface between the host device and storage device, the host device may first encrypt the data using a key, and then send the encrypted data to the storage device. For example, the key may be a public or private key derived from a standard asymmetric encryption operation performed between the host device and storage device. The storage device may later decrypt the data using the key in order to perform any requested computations. However, this key typically encompasses or protects the entire logical region or namespace storing this data in its entirety, which may include a broad range of logical block addresses (LBAs) potentially encompassing millions of LBAs for example. Such key may be referred to as a "key per logical region" or "key per namespace" throughout this disclosure, an example of which is illustrated in FIG. 6. Thus, the encrypted data in a namespace may include numerous other data that is not relevant to the requested computations.

As a result, if the host device intends the storage device to only perform a computation on a portion of this encrypted data, the storage device may end up having to decrypt the entire namespace or logical region of encrypted data just to process the relevant portion. For example, if the storage device stores encrypted data from multiple sensors, or encrypted data of a media transport stream having multiple video and audio sub-streams, in a logical region or namespace, the storage device would end up having to decrypt the data from all of the sensors or sub-streams in that logical region, even if the storage device is requested only to perform computations on data from one of the multiple sensors or from one of the sub-streams. Such decryption based on a key per logical region may pose a significant security risk, for example, if the storage device is requested to communicate the decrypted data in its entirety to the host device over the network interface for possible disclosure to another host device despite only requesting a portion of this data.

To provide a balance between the storage of encrypted data in a logical region and the security in decrypting data when a portion of this data is relevant for a computation, an exemplary embodiment of the storage device of the present disclosure utilizes a key for encryption or decryption of a data portion rather than for the entire logical region or data itself. For instance, rather than applying a key for a namespace including encrypted data, the storage device may apply a key specifically for the data requested to be computed in a particular application. Thus, different portions of data in a namespace may be encrypted using different keys, and a respective portion of the data in that namespace may be decrypted using one of these keys. Additionally, multiple portions of data in a namespace may be grouped together and encrypted using a key for that particular group, and multiple such groups of data portions may be respectively encrypted and decrypted using different keys for each group.

Figure 7:
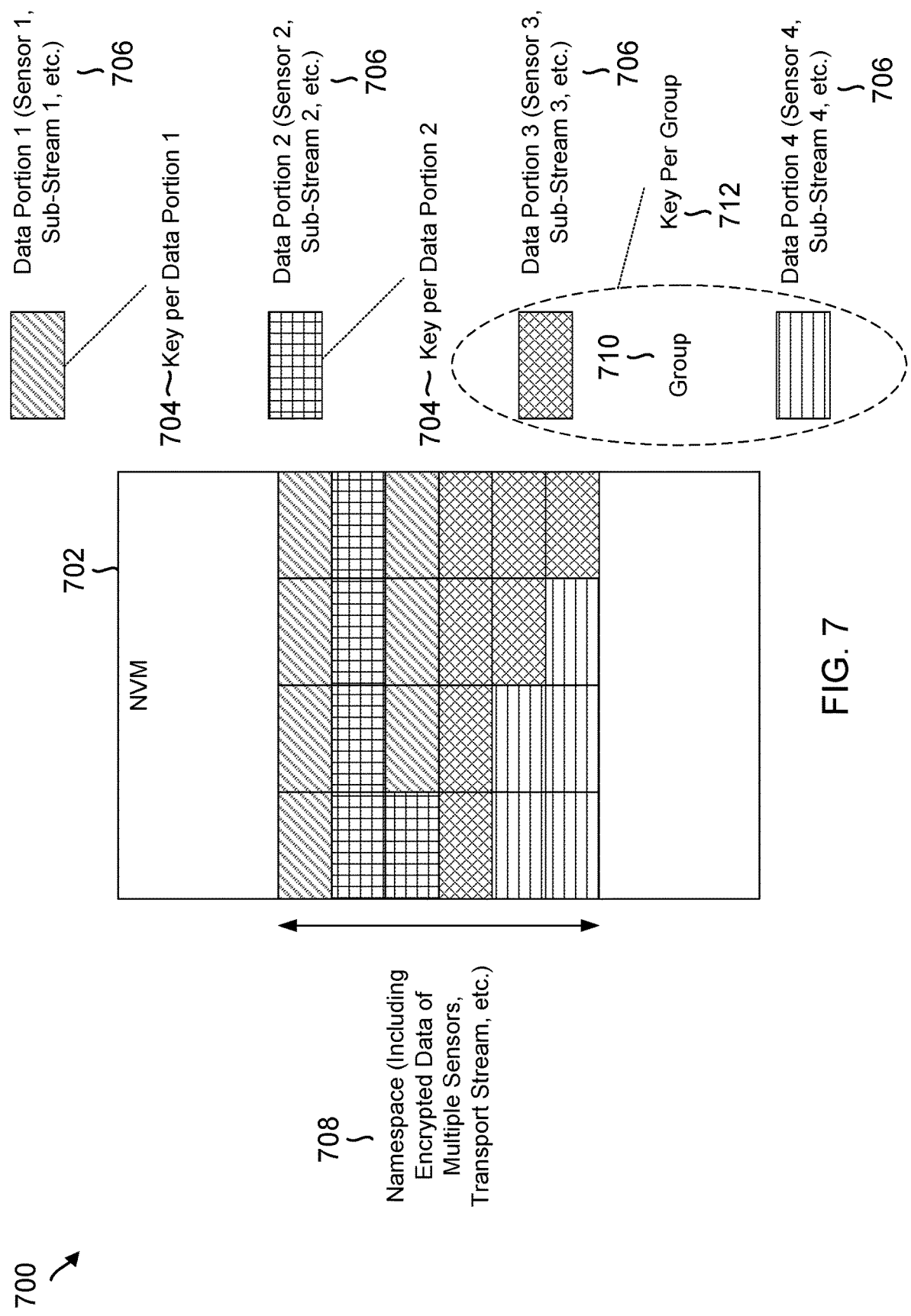
FIG. 7 is a conceptual diagram illustrating an example of a non-volatile memory storing data that is encrypted with respective keys for corresponding portions of the data.

Accordingly, each key referenced in the present disclosure may be considered as a "key per data" (or a "key per group" if the key is associated with a group of data portions), rather than a key per logical region. Examples of keys per data and a key per group are illustrated in FIG. 7. Here, a key per data (or group) is distinct from a key per logical region (or similarly a key per LBA or group of LBAs), since keys per data (or group) are associated with the data (or data portions or groups) themselves, rather than with the LBAs, regions, or namespaces storing such data. Similarly, a key per data (or group) as described throughout this disclosure is distinct from a key per input/output (I/O), which involves a key associated with a particular I/O transaction (e.g., a write+encrypt or a decrypt+read transaction or command). A key per I/O is similar to a key per namespace or logical region in that the key per I/O similarly encompasses a broad range of LBAs (albeit a smaller range than the key per namespace), particularly, the range of LBAs indicated in a write or read command. For example, a key per I/O may apply a key to encrypt a range of LBAs including multiple sensor data or an entire media transport stream written in a single I/O transaction. Thus, a key per I/O may lead to the same security risk issue discussed previously with respect to a key per namespace (e.g., too broad a decryption range). In contrast, a key per data is associated with specific data (not a range of LBAs) and thus may have much smaller breadth than a key per I/O (for example, encompassing a single sensor data or a single sub-stream within that media transport stream.)

As a result of applying keys per data, the storage device may perform computations (e.g., in house processing) on a data set without exposing other data sets. For instance, if the storage device stores encrypted data from multiple sensors in a namespace, or encrypted data of a media transport stream of video and audio sub-streams in the namespace, the storage device may decrypt and perform computations on data from one of the multiple sensors or from one of the sub-streams without decrypting the data in that namespace from the other sensors or sub-streams. As a result, a balance between encrypted data storage in a logical region and decrypted data security in that logical region may be improved.

In one example, a controller of the storage device may receive encrypted data from a host device, and a compute request for computing a portion of the encrypted data. During this time, the controller may receive a unique key or token for decrypting only a portion of the encrypted data. The key may be based on data, rather than on regions in the storage device. For example, the data associated with a key may be sensor data from a sensor, or a program stream in a media transport stream (e.g., one of multiple video or audio program streams encoded in the transport stream). In contrast, the encrypted data may be multiple sensor data of which one of the sensor data is the portion that is keyed/decrypted, or a transport stream of which one video or audio program is the portion that is keyed/decrypted. Thus, each video/audio stream of a transport stream, or sensor data of multiple sensor data, may have their own key. The controller may receive different keys for different data portions, such that controller only has access to whichever data is requested for performing a requested computation (e.g., data from one sensor but not data from another sensor).

The controller may perform in-house processing or computations (e.g., data filtering, analyzing, etc.) on a portion of the encrypted data (e.g., sensor data, media stream, etc.) following local decryption by the storage device of this portion using the key, without exposing other portions of the encrypted data (e.g., other sensor data). For example, the controller may apply a key associated with a compute request to a portion of the encrypted data to decrypt the data following retrieval of the encrypted data from flash memory, and afterwards the controller may perform a computation on the decrypted data. In this example, the data encryption may be performed by a host device in communication with the storage device, or by another remote system outside the storage device, while the data decryption may be performed by the storage device.

In one example where the data includes media sub-streams, the host device may first encode the streams (e.g. from a bitmap to a Joint Photographic Experts Group (JPEG) file), then encrypt the encoded streams respectively with different keys, and afterwards send a transport stream including the encrypted, encoded files or streams to the controller of the storage device. The controller may store the transport stream in NAND. Afterwards, in response to a compute request from the host device or another remote system including a key associated with a particular sub-stream in that transport stream, the controller may retrieve the transport stream, parse the transport stream for the requested sub-stream, decrypt the requested sub-stream using the provided key, and decode the decrypted stream (e.g., from a JPEG file back to a bitmap file). Then, the controller may process the decoded sub-stream by performing any requested computations on that stream.

The encrypted data may be grouped based on a compute requirement of the host device. For instance, the host device may group portions of data together with a unique key according to the target compute services of the storage device, and share that key with the controller to decrypt the group for computations. Similarly, the host may group other portions of the data together with a different key to prevent exposure of this other data during decryption of the target portions for computation. Here, each group of data may be part of the same non-volatile memory express (NVMe) set or namespace or logical region.

As an example of this grouping concept, each portion of the data may be different sensor data. For instance, the host device may encrypt data from six different sensors which are to be respectively stored in six logical sections (e.g., six respective LBA ranges) of the storage device. Here, the host device may intend to request one type of computation to be performed on the sensor data to be stored in logical sections 1, 3, and 5, and a different type of computation to be performed on the other sensor data to be stored in logical sections 2, 4, and 6, for example. In such case, the host device may group the data to be stored in the odd logical sections with one key and the data to be stored in the even logical sections with another key, so that data associated with one type of computation will not be decrypted in response to a computation request for data associated with another type of computation.

After decrypting the data based on a provided key and obtaining a computation requested by a host device, the controller may thrash (e.g., discard, overwrite, or otherwise refrain from storing in NAND) the decrypted data, the key, and any associated metadata with the computation from a volatile cache of the storage device. The controller may provide the computation or result to the host device as is (in raw data form) or in an encrypted form. The controller may similarly store the computation or result in the flash memory as is (in raw data form) or in an encrypted form according to a predetermined compute agreement with the host device.

In one example process flow involving a single host device or processor in communication with the storage device, initially the host device may group portions of data for computation, generate a key for each portion/group, and encrypt the portion(s)/group(s) using different keys. The host device may then transmit a host write command with all the encrypted data to the controller of the storage device, which stores the encrypted data in response to receiving the host write command. Afterwards, the controller may receive a compute service request from the host device for one of the portions of data or groups, including the key for the portion or group. In response to the request, the controller may retrieve the encrypted data from its non-volatile memory, and decrypt only the portion/group associated with the compute service request using the key. The controller may then perform requested computations on the decrypted data. Afterwards, the controller may thrash (refrain from storing in the non-volatile memory) any retrieved data, metadata, or partial/intermediate computation results stored in cache in response to the request. The controller may send the compute results (or encrypted compute results) to the host device in accordance with a predetermined agreement with the host device.

The controller may similarly interface with multiple processors, host devices, or processing systems and safeguard and compute data for each host device accordingly using respective encryption/decryption keys for different data portions. For instance, the controller may receive encrypted data, keys per different data portions, and compute requests from individual host devices (independently of other host devices). In such case, the controller may perform the aforementioned example process flow for each individual host device in communication with the storage device.

Alternatively, the controller may receive encrypted data from one party (e.g., one host, virtual machine, or a master) and a compute request from another party (e.g., another host, another virtual machine, or a slave) in a multi-host compute environment. As an example, one host device (e.g., a storage host device) may send encrypted data to the storage device and share a key for a portion of the data associated with a target compute requirement to another host (e.g., a compute host device). The compute host device may subsequently send the controller a compute request on a portion of the encrypted data using the shared key from the storage host device. In response, the controller may handle the compute request of the compute host device and after processing the data portion, the controller may thrash the base (decrypted) data, key, and intermediate data (e.g., metadata associated with the processing).

In one example process flow involving multiple host devices or processors in communication with the storage device, initially Host 1 (e.g., a storage host) may group portions of data for computation, generate a key for each portion/group, and encrypt the portion(s)/group(s) using different keys. Host 1 may then send to Host 2 (e.g., a compute host) the keys to be stored in a key mapping table between keys and data portions for Host 2 to use when sending compute requests. Host 1 may also send a host write command with all the encrypted data to the controller for the controller to store in non-volatile memory. Later on, the controller may receive a compute service request from Host 2 for one of the portions of data or groups, including the key for the portion or group from Host 2. In response, the controller may retrieve the encrypted data from the non-volatile memory, and decrypt only the portion/group associated with the compute service request using the key. The controller may then perform requested computations on the decrypted data, and afterwards thrash (refrain from storing in NAND) the retrieved data, metadata, or partial/intermediate computation results currently in cache. The controller may send the compute results (or encrypted compute results) to Host 2 in accordance with a predetermined agreement with Host 1 or Host 2.

In a different example, rather than receiving encrypted data from a host device and decrypting the data using provided keys as previously described, the controller may itself perform the encryption and decryption using keys obtained from the host. For instance, the host may send unencrypted data and key(s) for portion(s) of the data to the controller. In response to receiving the unencrypted data, the controller may encrypt the data using the key(s), store the encrypted data in NAND, and thrash (refrain from storing in NAND) the key(s) and any metadata applied for the encryption. Later on, the host (or another host) may provide a retrieval request to the controller including key(s) to access portion(s) of the stored data, and the controller may fetch the data, decrypt the requested portion(s), and perform computations on the decrypted portion(s) in response to the request.

In a further example, the controller may perform the encryption using its own generated keys (rather than provided keys from a host), and the host performs the decryption rather than the controller of the storage device. For instance, the controller may receive unencrypted data from the host, determine its own key(s), and encrypt portion(s) of the data using its own key(s) before writing to the non-volatile memory. The controller may provide the encrypted data (without decryption) to any host (the source data host or another host) in response to a retrieval request from that same host. The controller may also send the retrieving host a key for the encrypted data in a vendor specific command. In response, the host may decrypt the portion(s) of encrypted data the host intends for computations using the key(s) (e.g., according to a predetermined agreement with the storage device).

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the exemplary embodiment of FIG. 1, each memory location 112 may be a die 114 including multiple planes each including multiple blocks of multiple cells 116. Alternatively, each memory location 112 may be a plane including multiple blocks of the cells 116. The cells 116 may be single-level cells, multi-level cells, triple-level cells, quad-level cells, and/or penta-level cells, for example. Other examples of memory locations 112 are possible; for instance, each memory location may be a block or group of blocks. Each memory location may include one or more blocks in a 3-D NAND array. Each memory location 112 may include one or more logical blocks which are mapped to one or more physical blocks. Alternatively, the memory and each memory location may be implemented in other ways known to those skilled in the art.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123.

The memory (e.g. NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
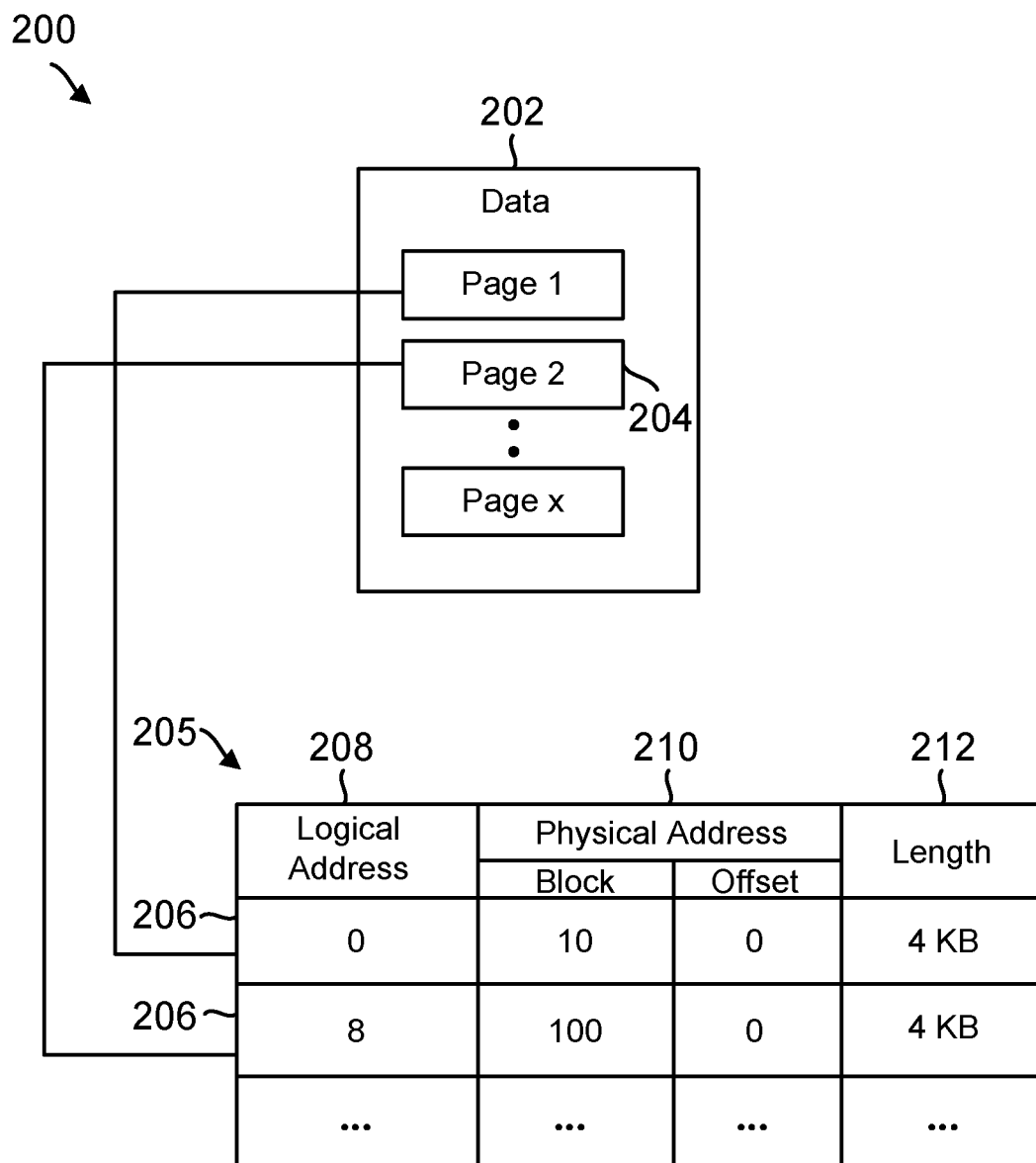
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size).

Referring back to FIG. 1, the volatile memory 118 also stores a cache 122 for the storage device 102. The cache 122 includes entries showing the mapping of logical addresses specified for data requested by the host 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g. it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116 located at the mapped physical addresses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host 104 via the host interface 106.

Figure 3:
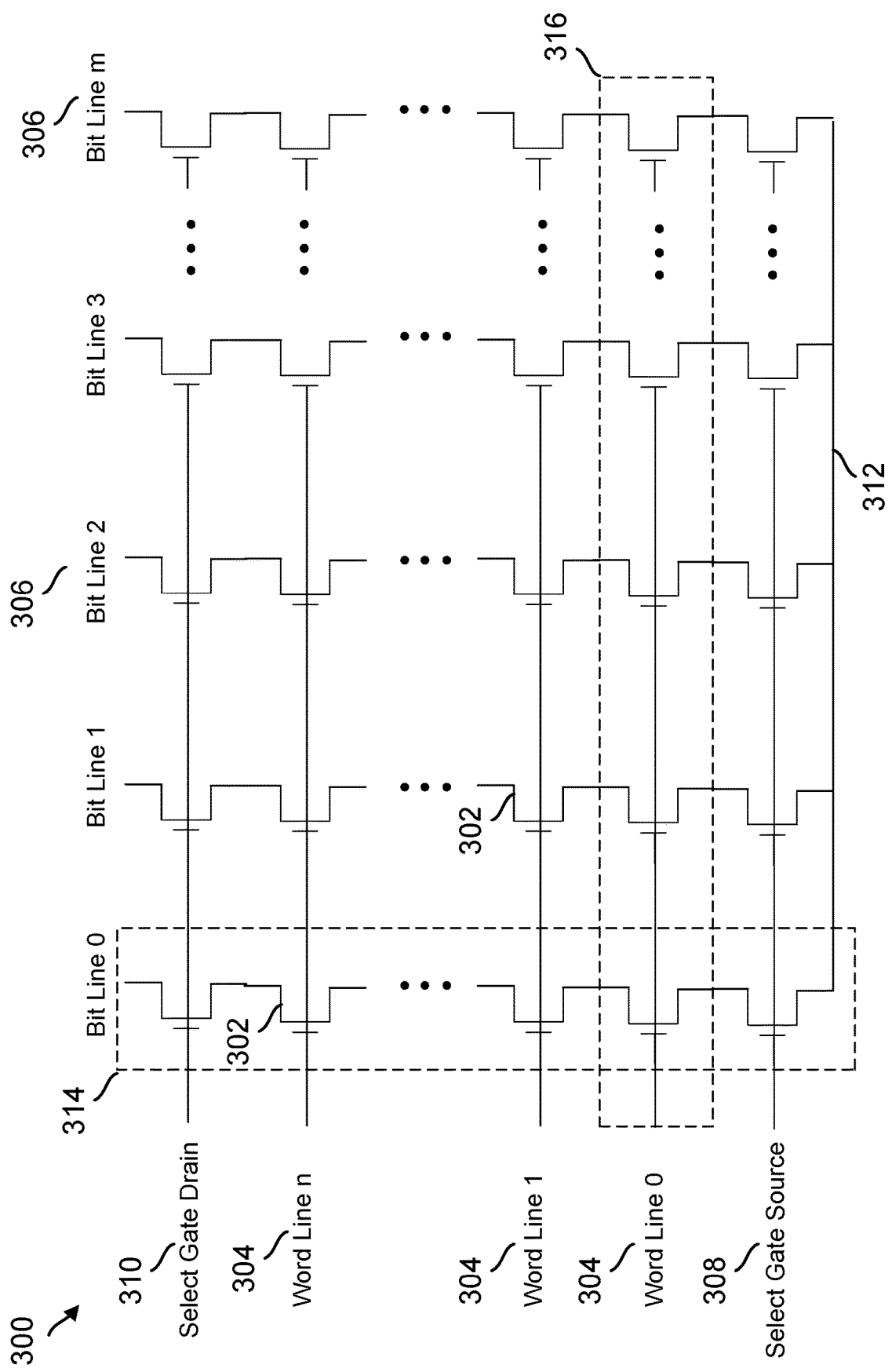
FIG. 3 is a conceptual diagram illustrating an example of an array of memory cells in the storage device of FIG. 1.

FIG. 3 illustrates an example of a NAND memory array 300 of cells 302. Cells 302 may correspond to cells 116 in the NVM 110 of FIG. 1. Multiple cells 302 are coupled to word lines 304 and bit lines 306. For example, the memory array 300 may include n word lines and m bit lines within a block of a die 114 of the NVM 110, where n and m are predefined according to the size of the block. Each word line and bit line may be respectively associated with a row and column address, which the controller 123 may use to select particular word lines and bit lines (e.g. using a row and column decoder). For example, word lines 0-n may each be associated with their own row address (e.g. word line 0 may correspond to word line address 0, word line 1 may correspond to word line address 1, etc.), and bit lines 0-m may each be associated with their own column address (e.g. bit line 0 may correspond to bit line address 0, bit line 1 may correspond to bit line address 1, etc.). Select gate source (SGS) cells 308 and select gate drain (SGD) cells 310 are coupled to the memory cells 302 on each bit line 306. The SGS cells 308 and SGD cells 310 connect the memory cells 302 to a source line 312 (e.g. ground) and bit lines 306, respectively. A string 314 may include a group of cells 302 (including SGS and SGD cells 308, 310) coupled to one bit line within a block, while a page 316 may include a group of cells 302 coupled to one word line within the block.

Figure 4:
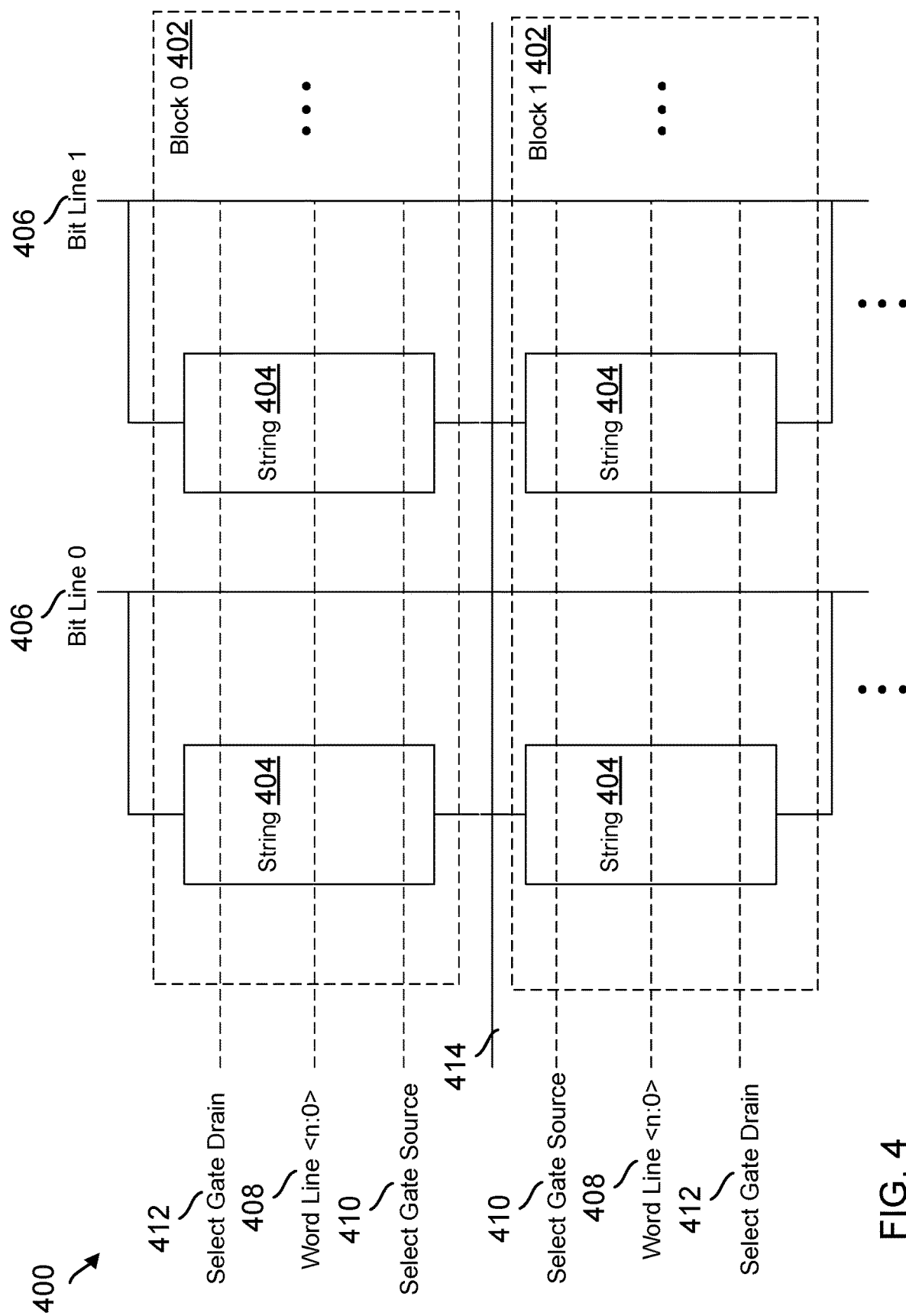
FIG. 4 is a conceptual diagram illustrating an example of an array of blocks in the storage device of FIG. 1.

FIG. 4 illustrates an example of a NAND memory array 400 of blocks 402 including multiple strings 404. Blocks 402 may correspond to blocks of a die 114 in the NVM 110 of FIG. 1, and strings 404 may each correspond to string 314 in FIG. 3. As in the memory array 300 of FIG. 3, each string 404 may include a group of memory cells each coupled to a bit line 406 and individually coupled to respective word lines 408. Similarly, each string may include a SGS cell 410 and SGD cell 412 which respectively connects the memory cells in each string 404 to a source line 414 and bit line 406.

When the controller 123 reads data from or writes data to a page 316 of cells 302 (i.e. on a word line 304, 408), the controller may send a command to apply a read voltage or program voltage to the selected word line and a pass through voltage to the other word lines. The read or programmed state of the cell (e.g. a logic '0' or a logic '1' for SLCs) may then be determined based on a threshold voltage of the cells 302. For example, during an SLC read operation, if the threshold voltage of a cell 302 is smaller than the read voltage (i.e. current flows through the cell in response to the read voltage), the controller 123 may determine that the cell stores a logic '1', while if the threshold voltage of the cell 302 is larger than the read voltage (i.e. current does not flow through the cell in response the read voltage), the controller 123 may determine that the cell stores a logic '0'. Similarly, during an SLC program operation, the controller may store a logic '0' by sending a command to apply the program voltage to the cell 302 on the word line 304, 408 until the cell reaches the threshold voltage, and during an erase operation, the controller may send a command to apply an erase voltage to the block 402 including the cells 302 (e.g. to a substrate of the cells such as a p-well) until the cells reduce back below the threshold voltage (back to logic '1').

For cells that store multiple bits (e.g. MLCs, TLCs, etc.), each word line 304, 408 may include multiple pages 316 of cells 302, and the controller may similarly send commands to apply read or program voltages to the word lines to determine the read or programmed state of the cells based on a threshold voltage of the cells. For instance, in the case of TLCs, each word line 304, 408 may include three pages 316, including a lower page (LP), a middle page (MP), and an upper page (UP), respectively corresponding to the different bits stored in the TLC. In one example, when programming TLCs, the LP may be programmed first, followed by the MP and then the UP. For example, a program voltage may be applied to the cell on the word line 304, 408 until the cell reaches a first intermediate threshold voltage corresponding to a least significant bit (LSB) of the cell. Next, the LP may be read to determine the first intermediate threshold voltage, and then a program voltage may be applied to the cell on the word line until the cell reaches a second intermediate threshold voltage corresponding to a next bit of the cell (between the LSB and the most significant bit (MSB)). Finally, the MP may be read to determine the second intermediate threshold voltage, and then a program voltage may be applied to the cell on the word line until the cell reaches the final threshold voltage corresponding to the MSB of the cell. Alternatively, in other examples, the LP, MP, and UP may be programmed together (e.g., in full sequence programming or Foggy-Fine programming), or the LP and MP may be programmed first, followed by the UP (e.g., LM-Foggy-Fine programming). Similarly, when reading TLCs, the controller 123 may read the LP to determine whether the LSB stores a logic 0 or 1 depending on the threshold voltage of the cell, the MP to determine whether the next bit stores a logic 0 or 1 depending on the threshold voltage of the cell, and the UP to determine whether the final bit stores a logic 0 or 1 depending on the threshold voltage of the cell.

Figure 5:
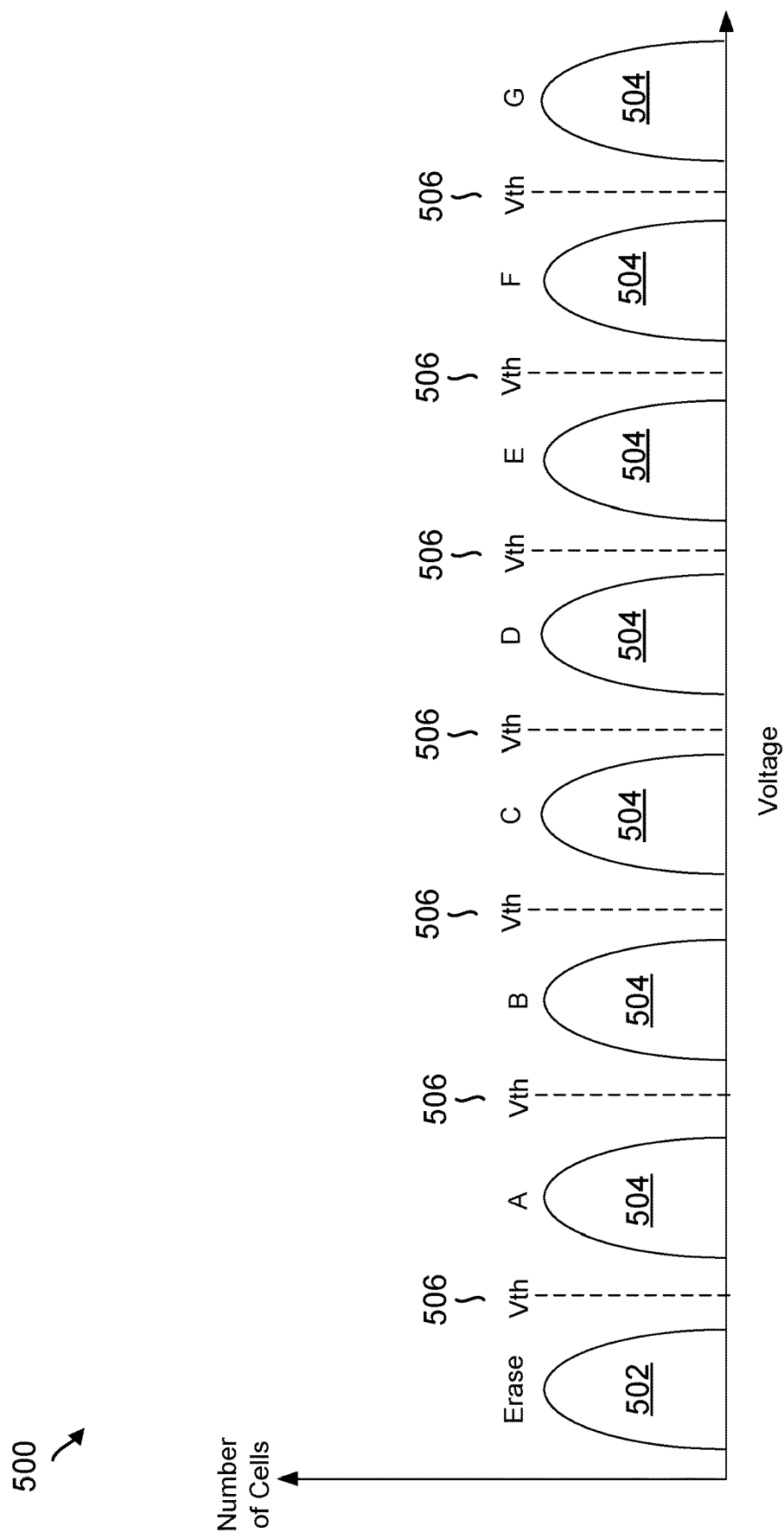
FIG. 5 is a graphical diagram illustrating an example of a voltage distribution chart for triple-level cells in the storage device of FIG. 1.

FIG. 5 illustrates an example of a voltage distribution chart 500 illustrating different NAND states for TLCs (e.g. cells 116, 302) storing three bits of data (e.g. logic 000, 001, etc. up to logic 111). The TLCs may include an erase state 502 corresponding to logic '111' and multiple program states 504 (e.g. A-G) corresponding to other logic values '000-110'. The program states 504 may be separated by different threshold voltages 506. Initially, the cells 116, 302 may be in the erase state 502, e.g. after the controller 123 erases a block 402 including the cells. When the controller 123 program LPs, MPs, and UPs as described above, the voltages of the cells 116, 302 may be increased until the threshold voltages 506 corresponding to the logic values to be stored are met, at which point the cells transition to their respective program states 504. While FIG. 5 illustrates eight NAND states for TLCs, the number of states may be different depending on the amount of data that is stored in each cell 116, 302. For example, SLCs may have two states (e.g. logic 0 and logic 1), MLCs may have four states (e.g. logic 00, 01, 10, 11), and QLCs may have sixteen states (e.g. erase and A-N).

FIG. 6 illustrates an example 600 of a NVM 602 (e.g., NVM 110) including data 604 (e.g., data 119) that is encrypted with a key 606 for a namespace 608 in which the encrypted data is stored. Typically, data 604 is encrypted with a particular key over a logical range or region, for example a namespace or NVM set. For instance, a host (e.g., host device 104) may send encrypted data using key 606 over a network interface (e.g., via host interface 106) to the storage device 102 for the controller 123 of the storage device to write to the NVM 110, 602 in namespace 608. Usually, the key 606 is used for encryption and decryption of the entire data in the namespace 608. However, this large granularity of encryption or decryption may result in a remote system having to undesirably share an entire namespace worth of decrypted data in the logical region with another remote system for the sake of computations. Accordingly, a middle ground is desirable where only a particular set of data within a namespace following decryption may be exposed, rather than the whole namespace itself, so that the other remote system may be restricted from accessing the other data.

FIG. 7 illustrates an example 700 of a NVM 702 (e.g., NVM 110) including data that is encrypted with keys 704 respectively for different data portions 706, rather than with a key for a namespace 708 storing the data as in the example of FIG. 6. Here, the controller 123 of the storage device 102 may receive a token (e.g., a unique key such as one of the keys 704) from the host device 104 for decrypting a portion of the encrypted data (e.g., one of the data portions 706) in the namespace 708. The portion of the encrypted data may be, for example, sensor data (e.g., from one sensor or multiple sensors) or a program stream in a media transport stream (e.g., one of multiple video or audio program streams encoded in the transport stream). The token allows the controller to only decrypt the data portion 706 encrypted using that token, for example, one video program, without decrypting other data portions, for example, other programs. This implementation sets up some restrictions on decryption while ensuring that security of the storage device may remain intact, since the controller may not decrypt other data portions using the same token or key. As an example, the host device may request the storage device to perform computations only on a particular media stream or only on particular sensor data (e.g., the controller may be requested to analyze data from a particular sensor or to filter data on a particular program), and so the key 704 may be directed to whatever task the storage device will be requested to perform. Thus, different tokens or keys 704 may be applied and provided by the host for different data portions 706 (e.g., one token for each program/sensor data that is provided or encrypted by the host system). Each token may be a public key, a private key, or other types of key that may be applied for encryption/decryption.

In one example, the host device 104 (e.g., an autonomous vehicle or some other security processor) may map one of the keys 704 or tokens to a particular data portion (e.g., a sensor data stream or a video or audio stream, such as a video sub-stream or audio sub-stream of a Moving Picture Experts Group (MPEG) stream). Thus, instead of associating that token with the entire namespace or portion of a namespace such as in the example of FIG. 6, here the host device may associate the key with a specific data stream. The host device may then send the encrypted data to the storage device 102 to store at indicated logical addresses (e.g., LBAs). When the host device later intends to retrieve the data portion, the host device may provide the key to the storage device for decryption at that time. The controller may read the encrypted data from the NVM 702 in response to the retrieval request from the host device, and the controller may decrypt the data portion without decrypting the other data portions using the provided key. The controller may then provide the decrypted data to the host device.

As an example, the host device 104 may intend to store in the NVM 702 a transport stream which has two video programs (where each video program corresponds to one of the data portions 706 in FIG. 7). Typically, the video programs will be combined in the transport stream, the transport stream is assigned to a range of LBAs, and the entire transport stream sits in the namespace 708 including those LBAs. Here, the host device encrypts the two video program streams using different keys 704 and combines the encrypted program streams in the transport stream (e.g., according to a standard media transporting protocol). The host device may then send the transport stream to the storage device to be stored in the namespace 708 as continuous sequential data. Later on, the host device may provide one of the keys 704 associated with one of those program streams, for example, in accompaniment with a data retrieval request. When the controller retrieves the transport stream from the NVM 702 in response to the retrieval request, the controller may apply this token to the transport stream and consequently only decrypt (and thus obtain access to) the specific requested program stream. In contrast, the other video stream of that transport stream will remain encrypted, since the controller may not decrypt the data using the same key.

Thus, in the aforementioned example, the host device may encrypt a first substream and the second substream, combine them in a transport stream, and instruct the storage device to program the transport stream sequentially in a LBA range. Later on, the host may provide a retrieval request for the transport stream in those LBAs, and the storage device may retrieve the encrypted transport stream itself in response to the retrieval request. Additionally, the host device may provide a computation request to the storage device to perform in-house computations for the particular video frames of one of the substreams. The computation request from the host device may include a command informing the storage device to for example, perform a task on one of the substreams in the LBAs (e.g., the namespace 708) where the transport stream is stored. For example, the host device may request the controller 123 to perform data filtering, video frame shortening, etc. in the first video substream only. To accomplish these computations, the host may provide the key 704 associated with only that first substream to the controller 123 to apply to decrypt only that data in the transport stream and thus securely perform the computations requested for that data, without exposing the other video substream (since the storage device may not have the key 704 for the other data). Thus, in response to the computation request, the controller may read the transport stream from the namespace, decrypt the indicated substream from the transport stream using the key 704, and then store the decrypted data for substream 1 in its volatile memory (e.g., volatile memory 118). The controller may subsequently apply the task indicated in the compute request to the decrypted data.

The transport stream may be encoded or compressed (e.g., from a bitmap image to a JPEG image according to a known JPEG standard) prior to the encryption. For instance, the host device may encode the video sub-streams from a bitmap to a JPEG, encrypt each of the sub-streams with respective keys, and combine the encrypted sub-streams in the transport stream. The host device may then send the transport stream (e.g., a set of the encoded files) to the storage device for the controller to store in the namespace 708. Afterwards, the host device may send the compute request to the storage device for one of the sub-streams. In response to the compute request, the controller may read the transport stream, parse the transport stream into the two program streams, and then decrypt the requested program stream using the decryption key the storage device has available for that program stream. Afterwards, the controller may decode or decompress the decrypted program stream (e.g., from JPEG back to bitmap according to the known JPEG standard). As a result, the storage device may have access to both programs but may only perform computations on the program for which it has the token, since only that program can be decrypted using that token. The storage device may not be able to decrypt and decode the other program stream without the other token since, in contrast to the example of FIG. 6, here the transport stream itself is not encrypted using a key for the namespace storing the transport stream. Rather, each of the sub-streams of that transport stream are encrypted using respective keys for each substream.

In another example, the data portion which the controller decrypts may be grouped based on a compute requirement of the host device. For instance, referring to FIG. 7, the host device may associate at least two of the data portions 706 in a group 710, and encrypt the data portions in that group using a key 712 specifically for that group (e.g., a key per group). The host device may similarly associate data portions in multiple groups with their own respective key per group (e.g., according to target compute services requested of the storage device). As an example, if a transport stream includes five programs but the host device intends the storage device to perform computations specifically on programs 1 and 3, the host device may group those programs using the same encryption key. With respect to the other programs 2, 4, and 5 which the host device may not intend for the storage device to access in response to the compute request, the host device may group those programs using a different encryption key. Later on after the transport stream is stored in the storage device, when the host device requests the storage device to perform the computations on programs 1 and 3 of that transport stream, the host device may provide to the storage device the former key for programs 1 and 3 but not the latter key for programs 2, 4, and 5 (e.g., since those program streams are irrelevant to the requested compute service). As a result, the storage device may decrypt and access only programs 1 and 3, and similarly perform computations on the video frames only associated with programs 1 and 3, without exposing the programs 2, 4, and 5 which are in the same NVMe set, namespace or logical region as programs 1 and 3. Similarly, the aforementioned example may apply to groups of sensor data rather than program streams (e.g., sensor data 1 and 3 with one key per group and sensor data 2, 4, and 5 with another key per group).

Moreover, some other remote system than the host device may send keys 704, 712 to the device for decryption. For instance, another system (e.g., a server system) than the host device may manage the keys that the host uses for its different data portions 706. Similarly, the other remote system may manage the keys, including grouping data to be associated with a key per group based on compute requirements. After the storage device receives a token from this other remote system, the storage device may decrypt and perform computations on indicated data portions.

After the controller 123 of the storage device 102 decrypts data portions 706 or groups 710 of data portions and performs the computations on the decrypted data accordingly (e.g., data filtering on a particular video frame), the controller may provide the resulting output of the computations (e.g., the filtered data) to the host device 104 and afterwards thrash (refrain from keeping across power cycles) any information associated with these computations in the volatile memory. For example, after the controller performs a computation on decrypted data and obtains the computation results, the controller may not store in the non-volatile memory the decrypted data, the key for the decrypted data, or metadata (e.g., logical addresses) for the decrypted data or computation results, since the storage of such information may cause that information to be at risk for unauthorized monitoring by an interceptor and thus pose a security threat. Thus, the controller may overwrite, discard, or otherwise refrain from storing in the NVM 702, any such information in the volatile memory 118, in response to a pre-configuration to this effect in the storage device or a configuration to this effect received from the host device. As a result, maximum security may be provided to this information.

Thus, the controller may decrypt requested data by the host device in response to a compute request/command that instructs the storage device to perform computations on the requested data which was previously encrypted by the host device or some other remote processor. Moreover, the controller may subsequently thrash any data, metadata, or other information in the volatile memory which is applied to decrypt or compute the data to promote security. However, the controller may provide the computation results to the host device, or encrypt and store the computation results in the NVM, according to a pre-determined compute agreement with the host device.

In other examples, multiple hosts/processors (e.g., multiple ones of host device 104) may communicate with the storage device 102, which acts as an interface between the hosts (e.g., via host interface 106). For instance, one host device may write data to the storage device, and another host device may access the compute capabilities of the storage device. As an example, the first host device may be a master processor and the second host device may be a slave processor, where the master intends to restrict the slave from having access to all the data stored in namespace 708. In such case, the master may send one or more of the keys 704, 712 to the slave so that the slave may access respective data portion(s) 706 accordingly (e.g., in a compute request to the storage device 102) without exposing other data portions in the namespace 708. In another example, referring to FIG. 7, a host device may intend data portion 1 (e.g., data from one sensor) in namespace 708 to be accessible by another host device but not data portion 2 (e.g., data from another sensor) to be accessible by that other host device, since the latter data portion may not be required for a particular computation. Therefore the host device (or a token management server in communication with the host device) may provide the key 704 for data portion 1 to that other host device but not the key 704 for data portion 2 to avoid exposing the latter data portion to the other host device. In response to the compute request, the storage device may provide the decrypted data (e.g., in data portion 1) over the network interface to all the host devices in communication with the storage device. The storage device may also thrash any stored data in volatile memory 118 which is associated with the decryption and computation of this data portion (e.g., data portion 1).

Figure 8:
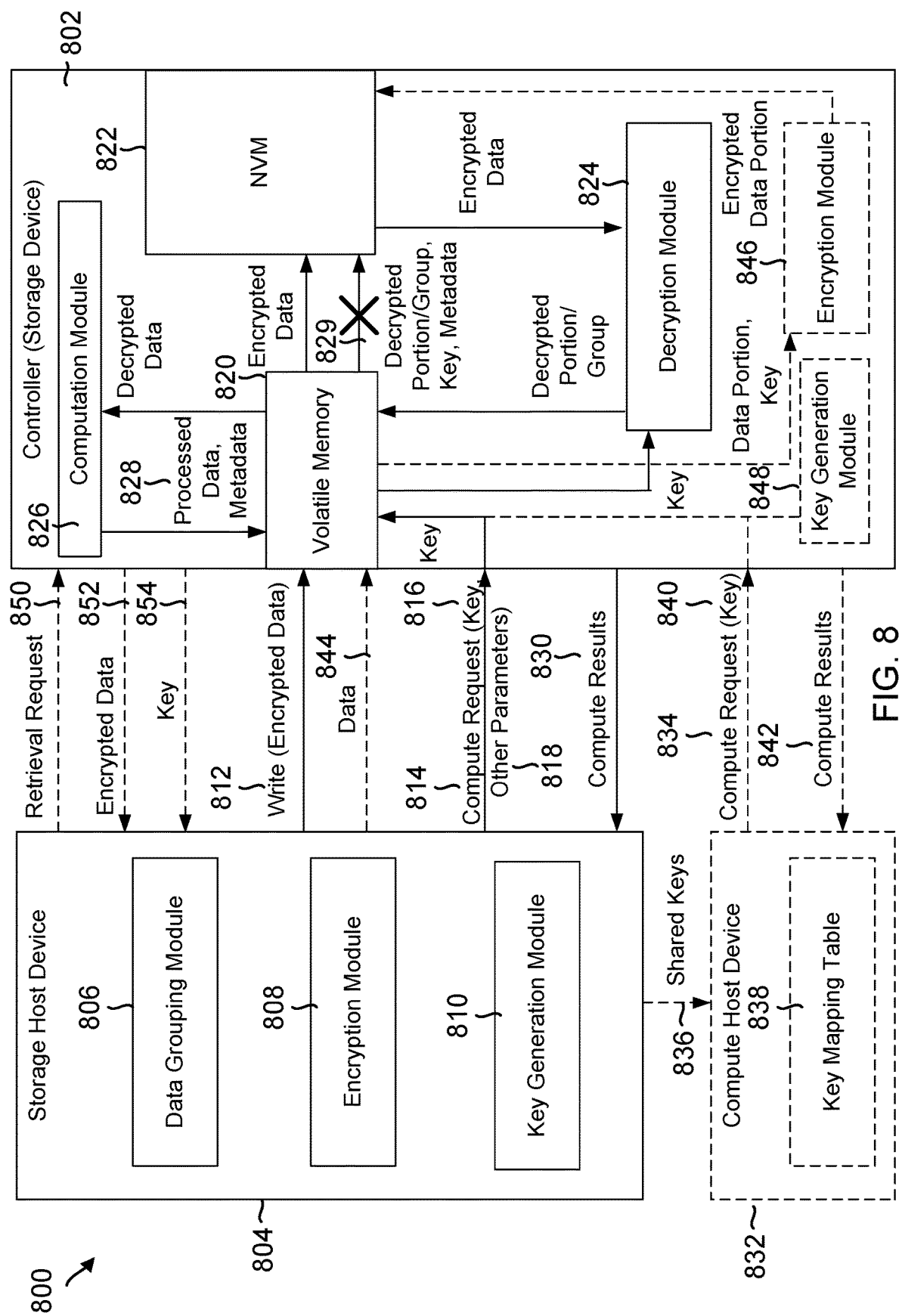
FIG. 8 is a conceptual diagram illustrating examples of communication flows between one or more host devices and a controller of the storage device in FIG. 1.

FIG. 8 illustrates an example 800 of a communication flow between one or more host devices and a controller 802 (e.g., controller 123) of the storage device 102. In one example, a host device 804 (e.g., host device 104) may include a data grouping module 806, an encryption module 808, and a key generation module 810. The data grouping module, encryption module, and key generation module may be, for example, software modules executed by one or more processors (e.g., the at least one processor 101) of the host device. The data grouping module 806 may be configured to perform data grouping based on compute requirements. For instance, as previously described with reference to FIG. 7, the data grouping module may form data portions 706 from a set of data (e.g., sensor data, a transport stream, etc.) which are relevant for a specific computation task (e.g., data filtering, machine learning, etc.), as well as groups of data portions (e.g., group 710 including data portion 3 and data portion 4), if any, in the event multiple data portions are relevant to a particular computation which the host device plans to subsequently request. The encryption module 808 may be configured to encrypt data using keys associated with different data portions. For instance, as previously described with reference to FIG. 7, the encryption module may encrypt data portions 706 (e.g., data portions 1 and 2) with respective keys 704 per data and groups (e.g., group 710) with respective keys 712 per group. The key generation module 810 may be configured to generate the keys which the encryption module applies to encrypt the data portions. For instance, with reference to FIG. 7, the key generation module may generate keys 704, 712 according to a standard encryption operation (e.g., as public keys or private keys), or as some other type of encryption/decryption keys, respectively for each data portion or group.

After encrypting the data portions (and any existing groups) with the keys accordingly, the host device 804 may transmit to the controller 802 of the storage device a write command 812 of the entire encrypted data to a logical region (e.g., namespace 708). In response to receiving the write command including the encrypted data, the controller may store the encrypted data in volatile memory (e.g., volatile memory 118), and when the write command is ready to be executed, the controller may process the write command and store the encrypted data in the NVM (e.g., NVM 110, 702).

Subsequently, the host device 804 may transmit a compute request 814 to the controller 802 of the storage device to access particular data (e.g., one of the data portions 706 or groups 710 in namespace 708). The compute request may include a key 816 for the data decryption (e.g., one of the keys 704, 712 associated with that data portion or group, respectively). The compute request may also include, or be preceded by, followed by, or accompanied by, other parameters 818 or configuration(s) which the controller may apply to retrieve, decrypt, and decode the requested data. For instance, if the controller is expected to perform computations on a particular video frame in a transport stream, the compute request may include configurations from the host device indicating information to decode the transport stream, information to identify which program in the transport stream includes that video frame, an LBA range of the transport stream, any groups of data in the stream to be computed, and other information (e.g., what programs to operate on, what frames to fetch, what computations to perform, the key to apply, etc.). Using these parameters, the storage device may retrieve the encrypted data from the namespace, parse the encrypted for the data portion or group in the request, and then decrypt and apply computations on that data portion or group.

Thus, in response to receiving the compute request including the key 816, the controller may store the key in volatile memory 820, and the controller may retrieve encrypted data including the requested data portion/group from a NVM 822 (e.g., NVM 110, 702) of the storage device. The controller may then proceed to decrypt the encrypted data for the requested data portion/group. For instance, the controller may include a decryption module 824, which may be, for example, a software module executed by one or more processors of the controller, which is configured to apply the key 816 and the other parameters 818 to the encrypted data to obtain a decrypted portion or group associated with the compute request. The controller, or the decryption module 824, may subsequently store the decrypted portion or group in the volatile memory 820.

After performing the decryption, the controller 802 may perform the requested computations on the decrypted data. For instance, the controller may include a computation module 826, which may be, for example, a software module executed by one or more processors of the controller, which is configured to perform the data filtering, machine learning, data transformation, or other computation indicated in the compute request 814 on the decrypted portion or group to obtain processed data 828 (e.g., the compute results) and metadata associated with the compute results. The controller, or the computation module 826, may store the processed data 828 and metadata in the volatile memory 820. Afterwards, the controller may thrash the decrypted data (e.g., the decrypted portion or group), the metadata, and partial computation results in the volatile memory 820 (i.e., refrain from storing this information in the NVM 822), such as illustrated in FIG. 8 by reference 829. Finally, the storage device may transmit the processed data as compute results 830 to the host device 804.

In an alternative example, a variation of the aforementioned communication flow may be implemented in a multi-host compute environment, where the host device 804 still sends the encrypted data to the controller 802 of the storage device, but another host device 832 (e.g., another one of host device 104 in communication with storage device 102) instead transmits the compute request to the controller. For example, in automotive use cases, the host device 804 may be a virtual machine (VM) (e.g., a dashcam) which may send the encrypted data to the storage device in the write command 812, and the other host device 832 may be another VM (e.g., an automated driver assistance system (ADAS)) which may send a compute request 834 for a portion of the data written by the host device 804. In this example, multiple VMs of the same system may behave as different hosts (or sub-hosts of the same environment), although in other examples, the VMs may be part of different systems, or the hosts may be devices other than VMs. The host device 804 may share keys 836 (e.g., keys 704, 712, 816 specifically associated with the data portions 706 or groups 710 which are targeted for compute services) with the other host device 832 for the other host device to store in a key mapping table 838 which maps keys to different data portions or groups. For instance, the key mapping table 838 may indicate the mapping of data portions 706, or groups 710 of data portions, to keys 704, 712 (e.g., the sensor data or media sub-streams associated with one key, the sensor data or media sub-streams associated with another key, etc.). The other host device may include one of these keys 840 when that device later provides the compute request 834 to the controller 802. After the controller 802 processes the encrypted data in accordance with the compute request, the controller 802 may provide compute results 842 to the other host device 832. The other host device 832 may then share the compute results 842 with the host device 804 if requested.

In another alternative example, a variation of the aforementioned communication flows may be implemented in which the encryption and decryption are both performed in the storage device 102 itself using keys 816, 840 obtained from the host device 804, 832 for the data portions or groups of data portions requested for computation in the encrypted data. For instance, in the example illustrated in FIG. 8, host device 804 may transmit data 844 (unencrypted) to the controller 802 of the storage device, and the controller may encrypt the data 844 using different keys generated at the storage device respectively for different data portions or groups of data portions. For example, the controller may include an encryption module 846, which may be, for instance, a software module executed by one or more processors of the controller, which is configured to encrypt data 844 using keys associated with different data portions (in a similar manner as described above for encryption module 808). Moreover, the controller may include a key generation module 848, which may be, for instance, a software module executed by one or more processors of the controller, which is configured to generate the keys which the encryption module 846 applies to encrypt the data portions (in a similar manner as described above for key generation module 810).

After performing the encryption, the controller 802 (e.g., the encryption module 846) may store the encrypted data (according to the different generated keys) in the NVM 822, and then thrash any keys or metadata associated with the encryption stored in the volatile memory 820 (i.e., refrain from storing this information in the NVM 822). Subsequently, the host device 804 or, in a multi-host compute environment, the other host device 832), may provide compute request 814 (or compute request 834) to the controller 802 of the storage device to process. In response to the request, the controller 802 (e.g., the decryption module 824) may decrypt the data portion or group using the key 816, 840 accompanying the compute request as previously described, and transmit the compute results 830 (or compute results 842) to the respective host device accordingly.

In a further alternative example, another variation of the aforementioned communication flows may be implemented in which the encryption is still performed in the storage device 102 as previously described, but the decryption is performed at the host device 804 or other host device 832. For example, after the controller 802 (e.g., the encryption module 846) encrypts data 844 such as previously described (e.g., using controller-generated keys at the storage device), the host device 804 may transmit a retrieval request 850 to the controller to retrieve the encrypted data (in its entirety without any decryption). In response to the retrieval request, the controller 802 may transmit encrypted data 852 to the host device 804 (or the other host device 832 if specified in the retrieval request). The controller 802 may also provide to the host device 804 (or other host device 832) the keys that the controller used to encrypt the different data portions or groups of data portions in the encrypted data 852. For example, in response to the retrieval request 850, the controller may transmit a vendor-specific command including a key 854 used to encrypt a relevant data portion, which key or data portion may be requested by the host device in the retrieval request. In response to receiving the encrypted data 852 and key 854, the host device 804 may decrypt the corresponding data and process the decrypted data for computations or other purposes. Thus, the host device may decrypt the data in this example similar to the controller of the storage device in the other examples using keys per data, rather than keys per namespace, logical region, IO, etc., providing balance between data storage and security.

Figure 9:
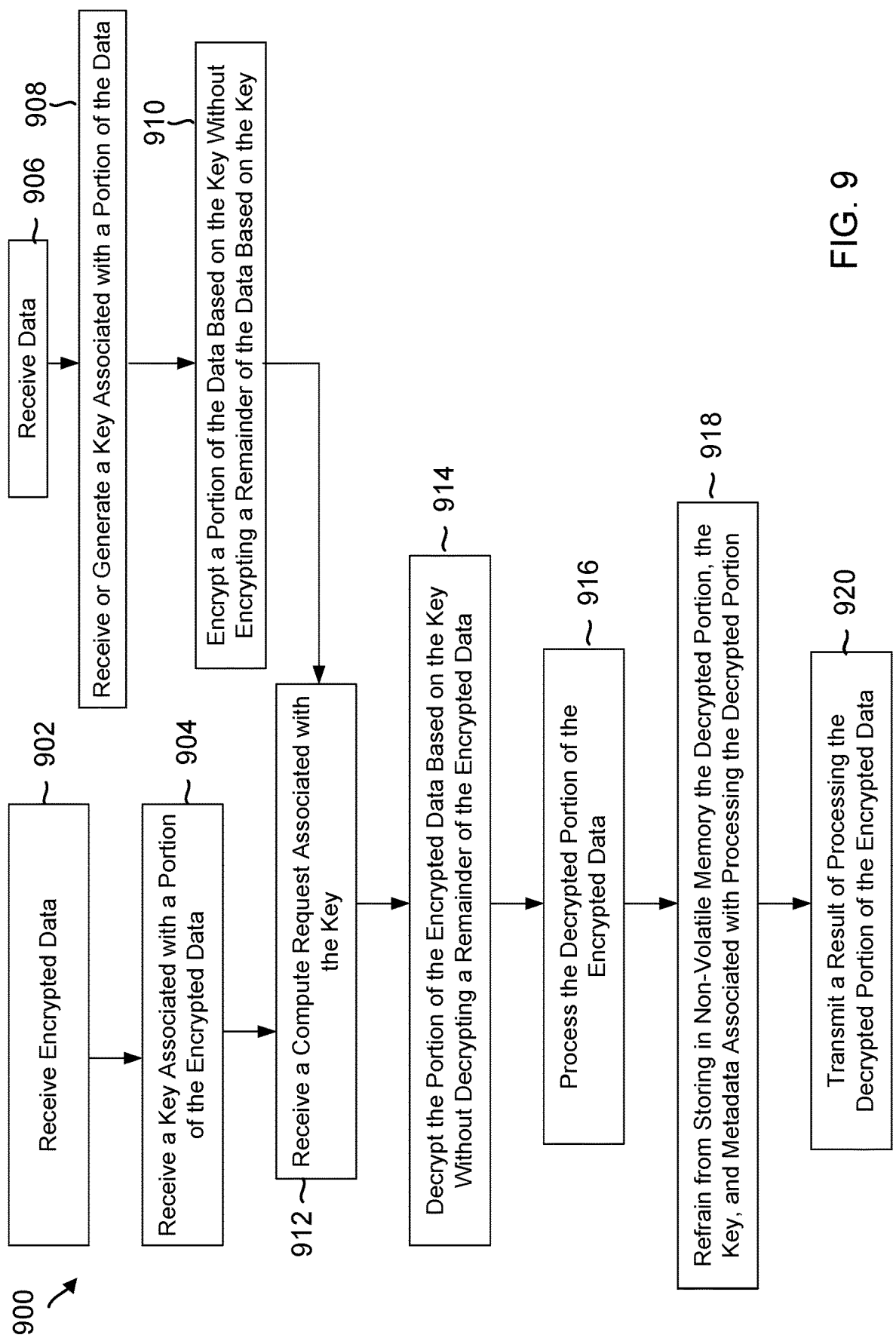
FIG. 9 is a flow chart illustrating an example of a method for processing a portion of stored data which is encrypted using respective keys for corresponding data portions, as performed by the storage device of FIG. 1.

FIG. 9 illustrates an example flow chart 900 of a method for processing a portion of stored data which is encrypted using respective keys for corresponding data portions. For example, the method can be carried out in a storage device 102 such as the one illustrated in FIG. 1. Each of the steps in the flow chart can be controlled using the controller as described below (e.g. controller 123, 802), by a component or module of the controller, or by some other suitable means.

In one example where the host device performs the encryption, as represented by block 902, the controller may receive encrypted data, and as represented by block 904, the controller may receive a key associated with a portion of the encrypted data. In one example, the encrypted data may include data from a plurality of sensors, and the portion of the encrypted data may include the data from one of the sensors. In another example, the encrypted data may include a transport stream having a plurality of sub-streams, and the portion of the encrypted data may include one of the sub-streams. Furthermore, in connection with block 904, the controller may receive a plurality of keys associated with respective portions of the encrypted data. In response to receiving the encrypted data, the controller may store the encrypted data in volatile memory and write the encrypted data from the volatile memory to non-volatile memory. In one example, the encrypted data may comprise a plurality of portions, and the key may be associated with a group of the portions. In one example, the controller may receive a plurality of keys associated with respective groups of portions of the encrypted data.

Alternatively, in another example where the controller performs the encryption, as represented by block 906, the controller may receive data, and as represented by block 908, the controller may receive a key associated with a portion of the data. Alternatively at block 908, the controller may generate a key associated with a portion of the data. Afterwards, as represented by block 910, the controller may encrypt a portion of the data based on the key without encrypting a remainder of the data based on the key. In one example where the controller receives a plurality of keys associated with respective portions of the data, the controller may encrypt each of the respective portions based on a corresponding one of the keys. The controller may store the encrypted portion of the data in the non-volatile memory. In another example, the controller may generate a plurality of keys associated with respective portions of the data, and encrypt each of the respective portions based on a corresponding one of the keys.

Following the above steps in either example, as represented by block 912, the controller may receive a compute request associated with the key. In one example, the controller may receive the encrypted data from a first host, and receive the compute request and the key respectively from a second host.

Next, as represented by block 914, the controller may decrypt the portion of the encrypted data based on the key without decrypting a remainder of the encrypted data, and as represented by block 916, the controller may process the decrypted portion of the encrypted data. In one example where the controller receives a plurality of keys associated with respective portions of the encrypted data, the controller may decrypt each of the respective portions based on a corresponding one of the keys. In one example, the controller may decrypt the portion of the encrypted data and process the decrypted portion of the encrypted data in response to the compute request. In one example, in response to receiving the compute request and the key, the controller may store the key in the volatile memory, read the encrypted data from the non-volatile memory, and after decrypting the portion of the encrypted data, store the decrypted portion of the encrypted data in the volatile memory. In one example, the controller may decrypt a group of the portions of the encrypted data based on a key without decrypting the remainder of the encrypted data outside the group. In one example, where the controller receives a plurality of keys associated with respective groups of portions of the encrypted data, the controller may decrypt each of the respective groups based on a corresponding one of the keys. In one example where the controller performs the encrypting, the controller may decrypt one of the encrypted respective portions based on the corresponding one of the keys without decrypting the remainder of the encrypted respective portions.

Afterwards, as represented by block 918, the controller may refrain from storing in non-volatile memory the decrypted portion, the key, and metadata associated with processing the decrypted portion. In one example where the controller performs the encrypting, after encrypting the portion of the data, the controller may store the encrypted portion of the data in the non-volatile memory, and refrain from storing the key and metadata associated with the encrypting in the non-volatile memory.

Finally, as represented by block 920, the controller may transmit a result of processing the decrypted portion of the encrypted data. In another example, the controller may transmit the encrypted portion of the data to a host in response to a retrieval request from the host. The controller may also transmit the key to the host in response to the retrieval request.

Figure 10:
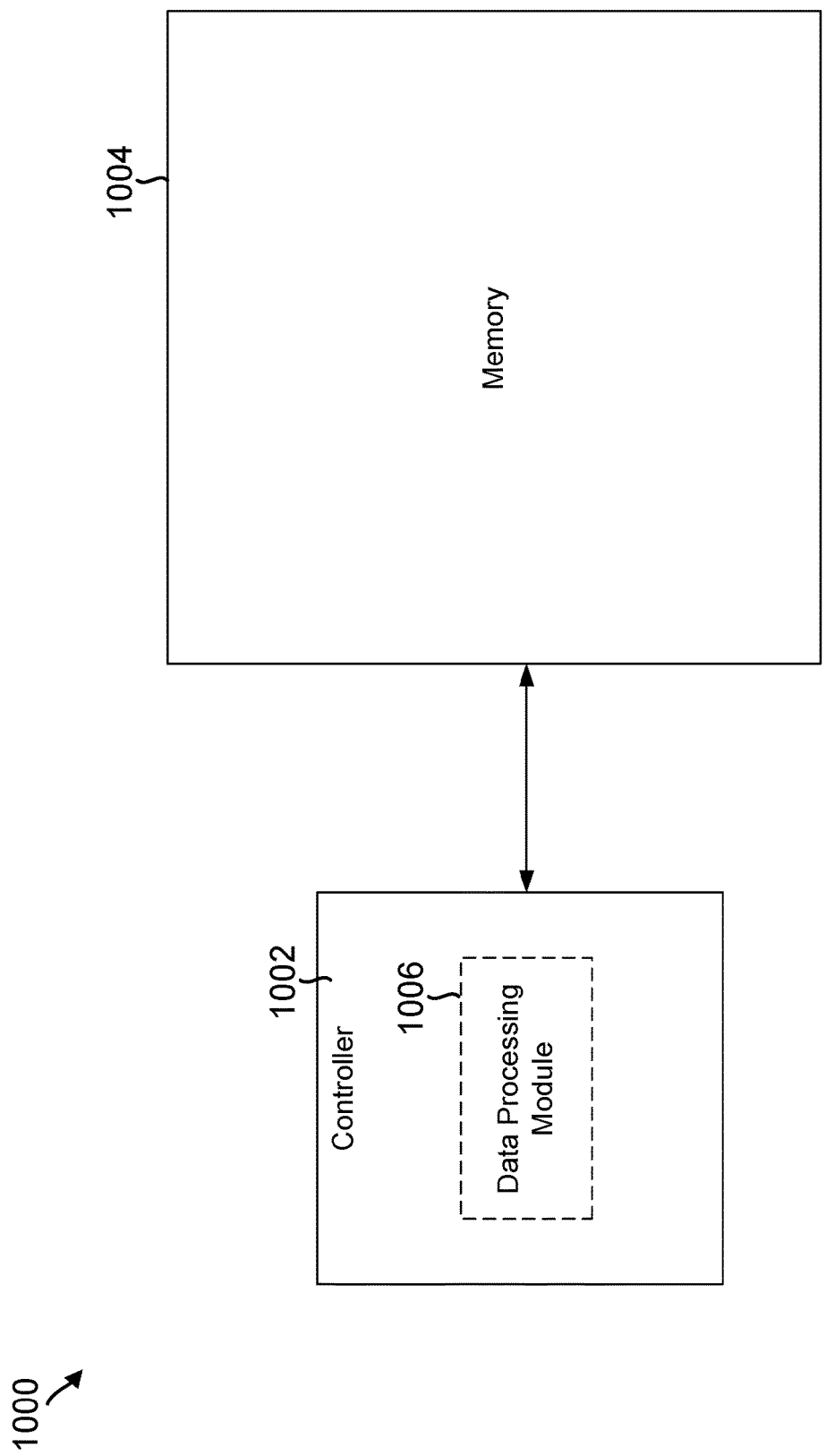
FIG. 10 is a conceptual diagram illustrating an example of a controller that processes a portion of stored data which is encrypted using respective keys for corresponding data portions in the storage device of FIG. 1.

FIG. 10 is a conceptual diagram illustrating an example 1000 of a controller 1002 coupled to a memory 1004 in a storage device. For example, controller 1002 may correspond to controller 123, 802 and memory 1004 may correspond to the NVM 110, 822 of the storage device 102 in FIG. 1. The controller may be implemented in software, hardware, or a combination of hardware and software. In one exemplary embodiment, the controller is implemented with several software modules executed on one or more processors, but as those skilled in the art will appreciate, the controller may be implemented in different ways. The skilled artisan will readily understand how best to implement the controller based on the particular design parameters of the system.

In one example, the controller 1002 includes a data processing module 1006 that may provide a means for processing a portion of stored data which is encrypted using respective keys for corresponding data portions. For example, the data processing module 1006 may perform the process or algorithm described above with respect to FIG. 9.

Accordingly, through the use of keys per data (or keys per groups of data), the storage device of the present disclosure may perform partial decryption of encrypted data or encryption of provided data, thereby providing a balance between strict data security and data storage for target compute services.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
   a controller configured to:
   receive encrypted data,
   receive a key associated with a portion of the encrypted data,
   receive a compute request associated with the key,
   decrypt the portion of the encrypted data based on the key without decrypting a remainder of the encrypted data,
   process the decrypted portion of the encrypted data in response to the compute request, and
   transmit a result of processing the decrypted portion of the encrypted data.

2. The storage device of claim 1, wherein the encrypted data includes data from a plurality of sensors, and the portion of the encrypted data includes the data from one of the sensors.

3. The storage device of claim 1, wherein the encrypted data includes a transport stream having a plurality of sub-streams, and the portion of the encrypted data includes one of the sub-streams.

4. The storage device of claim 1, wherein the controller is further configured to receive a plurality of keys associated with respective portions of the encrypted data, and to decrypt each of the respective portions based on a corresponding one of the keys.

5. The storage device of claim 1, wherein the controller is further configured to receive the encrypted data from a first host, and to receive the compute request and the key from a second host.

6. The storage device of claim 1, further comprising:
a non-volatile memory;
a volatile memory;
wherein, in response to receiving the encrypted data, the controller is further configured to store the encrypted data in the volatile memory and to write the encrypted data from the volatile memory to the non-volatile memory;
wherein, in response to receiving the compute request and the key, the controller is further configured to store the key in the volatile memory, to read the encrypted data from the non-volatile memory, and after decrypting the portion of the encrypted data, to store the decrypted portion of the encrypted data in the volatile memory; and
wherein, after processing the decrypted portion of the encrypted data, the controller is further configured to refrain from storing in the non-volatile memory the decrypted portion, the key, and metadata associated with the processing.

7. The storage device of claim 1, wherein the encrypted data comprises a plurality of portions including the portion, the key is associated with a group of the portions, and the controller is further configured to decrypt the group of the portions based on the key without decrypting the remainder of the encrypted data outside the group.

8. The storage device of claim 1, wherein the controller is further configured to receive a plurality of keys associated with respective groups of portions of the encrypted data, and to decrypt each of the respective groups based on a corresponding one of the keys.

9. A storage device, comprising:
a non-volatile memory;
a volatile memory;
a controller configured to receive data, to receive a key associated with a portion of the data, and to encrypt the portion of the data based on the key without encrypting a remainder of the data based on the key,
wherein, in response to receiving the key, the controller is further configured to store the key in the volatile memory; and
wherein, after encrypting the portion of the data, the controller is further configured to store the encrypted portion of the data in the non-volatile memory, and to refrain from storing the key and metadata associated with the encrypting in the non-volatile memory.

10. The storage device of claim 9, wherein the controller is further configured to decrypt the encrypted portion of the data based on the key without decrypting the remainder of the data.

11. The storage device of claim 9, wherein the controller is further configured to receive a plurality of keys associated with respective portions of the data, and to encrypt each of the respective portions based on a corresponding one of the keys.

12. The storage device of claim 11, wherein the controller is further configured to decrypt one of the encrypted respective portions based on the corresponding one of the keys without decrypting the remainder of the encrypted respective portions.

13. The storage device of claim 9, wherein the controller is further configured to receive a compute request associated with the key, and to decrypt the encrypted portion of the data and to process the decrypted portion in response to the compute request.

14. A storage device, comprising:
a volatile memory
a non-volatile memory; and
a controller configured to receive data, to generate a key associated with a portion of the data, to encrypt the portion of the data based on the key without encrypting a remainder of the data based on the key,
wherein, in response to receiving the key, the controller is further configured to store the key in the volatile memory; and
wherein, after encrypting the portion of the data, the controller is further configured to store the encrypted portion of the data in the non-volatile memory, and to refrain from storing the key and metadata associated with the encrypting in the non-volatile memory.

15. The storage device of claim 14, wherein the controller is further configured to transmit the encrypted portion of the data to a host in response to a retrieval request from the host.

16. The storage device of claim 15, wherein the controller is further configured to transmit the key to the host in response to the retrieval request.

17. The storage device of claim 14, wherein the controller is further configured to generate a plurality of keys associated with respective portions of the data, and to encrypt each of the respective portions based on a corresponding one of the keys.

* * * * *